(12) United States Patent
Gray (10) Patent No.: US 12,023,637 B2
(45) Date of Patent: Jul. 2, 2024

(54) CAPILLARY TUBE DROPLET GENERATION SYSTEMS AND METHODS

(71) Applicant: Mark A. Gray, Avalon, CA (US)

(72) Inventor: Mark A. Gray, Avalon, CA (US)

(*) Notice: Subject to any disclaimer, the term of this patent is extended or adjusted under 35 U.S.C. 154(b) by 635 days.

(21) Appl. No.: 17/209,948

(22) Filed: Mar. 23, 2021

(65) Prior Publication Data

US 2021/0291129 A1 Sep. 23, 2021

Related U.S. Application Data

(60) Provisional application No. 62/993,453, filed on Mar. 23, 2020.

(51) Int. Cl.
| | |
|---|---|
| *B01F 33/30* | (2022.01) |
| *B01F 23/41* | (2022.01) |
| *B01F 35/221* | (2022.01) |
| *B01F 35/71* | (2022.01) |
| *B33Y 80/00* | (2015.01) |

(52) U.S. Cl.
CPC ............ *B01F 33/304* (2022.01); *B01F 23/41* (2022.01); *B01F 35/2213* (2022.01); *B01F 35/7172* (2022.01); *B33Y 80/00* (2014.12); *B01F 23/4143* (2022.01); *B01F 23/4145* (2022.01)

(58) Field of Classification Search
CPC .......................... B01F 33/30; B01L 2200/0673
See application file for complete search history.

(56) References Cited

U.S. PATENT DOCUMENTS

| | | | |
|---|---|---|---|
| 5,061,741 A | 10/1991 | Miyata et al. | |
| 6,190,870 B1 | 2/2001 | Schmitz et al. | |
| 7,776,927 B2 * | 8/2010 | Chu | B01F 25/313 |
| | | | 428/407 |
| 7,985,058 B2 | 6/2011 | Gray | |
| 11,118,218 B2 * | 9/2021 | Gray | C12Q 1/686 |
| 11,123,297 B2 * | 9/2021 | Weitz | A61K 8/87 |
| 2005/0202489 A1 | 9/2005 | Cho et al. | |
| 2006/0181557 A1 | 8/2006 | Hoisington et al. | |
| 2007/0035597 A1 | 2/2007 | Ready et al. | |

(Continued)

FOREIGN PATENT DOCUMENTS

| | | |
|---|---|---|
| GB | 2453585 A | 4/2009 |
| WO | 2005/073410 A2 | 8/2005 |

(Continued)

OTHER PUBLICATIONS

Loscertales, I.G., et al., "Micro/Nano Encapsulation via Electrified Coaxial Liquid Jets," Science, vol. 295, pp. 1695-1698 (2002).

*Primary Examiner* — Jacob J Cigna (74) *Attorney, Agent, or Firm* — Acuity IP, LLC; Nathan S. Cassell (57) ABSTRACT

A droplet generating system includes a reservoir configured to receive an organic fluid and an aqueous fluid, a barrier separating the reservoir into a first reservoir portion and a second reservoir portion, a tube, and an indexer. The barrier is capable of preventing the aqueous fluid from entering the second reservoir portion from the first reservoir portion. The tube is disposed near the barrier, and the tube has a microfluidic channel. The indexer guides the aqueous fluid and the organic fluid into the microfluidic channel so as to form droplets of the aqueous fluid.

19 Claims, 11 Drawing Sheets

(56) References Cited

U.S. PATENT DOCUMENTS

| | | |
|---|---|---|
| 2008/0171077 A1 | 7/2008 | Gray |
| 2010/0203142 A1 | 8/2010 | Zhang et al. |
| 2011/0086780 A1 | 4/2011 | Colston et al. |
| 2011/0129941 A1 | 6/2011 | Kumacheva et al. |
| 2012/0190032 A1 | 7/2012 | Ness et al. |
| 2013/0344589 A1 | 12/2013 | Winkler et al. |
| 2014/0193857 A1 | 7/2014 | Gray |
| 2016/0037802 A1 | 2/2016 | Willcocks et al. |
| 2016/0167053 A1* | 6/2016 | Gray .................. B01F 33/3011 435/6.12 |

FOREIGN PATENT DOCUMENTS

| | | |
|---|---|---|
| WO | 2011/129697 A1 | 10/2011 |
| WO | 2012/142192 A2 | 10/2012 |
| WO | 2014/089579 A1 | 6/2014 |
| WO | 2019-090062 A1 | 5/2019 |

* cited by examiner

CAPILLARY TUBE DROPLET GENERATION SYSTEMS AND METHODS

CROSS-REFERENCES TO RELATED APPLICATIONS

This application claims the benefit of U.S. Provisional Patent Application No. 62/993,453 filed Mar. 23, 2020, the content of which is incorporated herein by reference for all purposes.

BACKGROUND OF THE INVENTION

Droplet generation systems are broadly applicable across a spectrum of biological assays. Many such "droplet-based assays" require a small aqueous fluid sample of just a few microliters or milliliters to be divided into thousands or millions of droplets suspended in a carrier fluid. Despite the widespread use of lithographic and PDMA-type replication processes that can produce complex microfluidic devices in a chip-format substrate, a simple, low-cost solution to droplet generation solution continues to elude the market.

There is a present need for a simple device with a low manufacturing cost, minimal manufacturing steps, and few opportunities for error during fabrication and use. At least some of these objectives are met by the present invention.

BRIEF SUMMARY OF THE INVENTION

In one aspect, embodiments of the present invention encompass systems and methods for generating droplets. An exemplary droplet generating system can include a reservoir configured to receive an organic fluid and an aqueous fluid, a barrier separating the reservoir into a first reservoir portion and a second reservoir portion, where the barrier is capable of preventing the aqueous fluid from entering the second reservoir portion, a tube disposed near the barrier, the tube having a microfluidic channel, and an indexer which guides the aqueous fluid and the organic fluid into the microfluidic channel so as to form droplets of the aqueous fluid. In some cases, the first reservoir portion is above the second reservoir portion in a vertically stacked orientation. In some cases, the indexer is in fluid communication with an upper and lower surface of the barrier. In some cases, the indexer creates an organic fluid-aqueous fluid interface positioned generally perpendicular to a longitudinal axis of the tube. In some cases, the organic fluid and aqueous fluid are drawn through the microfluidic channel with a pressure differential.

In another aspect, an exemplary droplet generating device can include an indexer configured to receive a first fluid enter from above and a second fluid from below, where the first fluid and the second fluid are immiscible, and a tube having a microfluidic channel configured to receive the first fluid and second fluid. In some cases, the first fluid includes oil and the second fluid comprises water. In some cases, a droplet generating device can further include a reservoir configured to receive the first fluid and second fluid prior to entering the indexer. In some cases, the tube is insertable into the device. In some cases, the device is made using additive manufacturing. In some cases, the additive manufacturing comprises stereolithography. In some cases, a droplet generating device can further include a body housing the indexer and at least a portion of the tube. In some cases, the body is comprised of or includes a polymer. In some cases, the polymer is hydrophobic. In some cases, the body is configured to fit a base station. In some cases, the body is gas tight and connects to the base station with a locking mechanism. In some cases, the locking mechanism includes a quick disconnect, a pressure fit or threads. In some cases, the locking mechanism is on an exterior of the device. In some cases, the base station includes a gas pressure source, a pressure regulator, and a pneumatic on/off switch.

INCORPORATION BY REFERENCE

All publications, journal articles, books, technical references, patents, and patent applications mentioned in this specification are herein incorporated by reference to the same extent as if each individual publication, journal article, book, technical reference, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Specific embodiments of the disclosed devices, systems, and methods will now be described with reference to the drawings. Nothing in this detailed description is intended to imply that any particular component, feature, or step is essential to the invention.

Droplet generating systems are provided that minimize complexity and cost by minimizing microscale design features. The droplet generating systems described herein have a streamlined design that utilizes a novel and larger-scale geometry for the merging of two fluids such that an emulsion can be made quickly and reliably with zero dead volume. At its core, the droplet generating systems provide a mechanism for a single capillary tube segment to act as a droplet generator when combined with two additional components, an indexer and a semipermeable barrier.

In one embodiment, at least one fluid is divided into meaningfully uniform droplets within at least a second immiscible fluid using a single reservoir, a common port, a semi-permeable barrier, an indexer, and a capillary tube segment. This combination of elements provides for physical separation of two immiscible fluids within a common reservoir; directing those two separate fluid flows into an indexer where a fluid-fluid interface is maintained, and combining those fluid flows as a coaxial flow within a segment of ordinary capillary tubing with flat cut ends. Such a system does not require microscale features beyond those inherent to the capillary tube, and thus avoids much of the cost and complexity common to existent droplet generation devices.

The droplet generating systems described herein include improvements upon droplet generating systems described in U.S. patent application Ser. No. 14/889,132 filed Dec. 9, 2013, PCT Patent Application No. PCT/US2013/073957 filed Dec. 9, 2013, U.S. patent application Ser. No. 14/024, 145 filed Sep. 11, 2013, U.S. Provisional Patent Application No. 61/734,952 filed Dec. 7, 2012, and U.S. Provisional Patent Application No. 61/700,241 filed Sep. 12, 2012, each of which is incorporated herein by reference for all purposes. The droplet generating systems described herein also include improvements upon droplet generating systems described in U.S. patent application Ser. No. 16/865,062 filed May 1, 2020, PCT Patent Application No. PCT/US2018/058938 filed Nov. 2, 2018, and U.S. Provisional Application No. 62/581,548 filed Nov. 3, 2017, each of which is incorporated herein by reference for all purposes. In some embodiments, similar features include 1) a single reservoir (also the inlet) to contain two fluids, an aqueous phase and an organic phase, 2) a barrier that enables two fluidic pathways from the single reservoir, 3) a tube that recombines the two phases to create an emulsion, and 4) an outlet to a separate, removable receptacle. However, the droplet generating systems described herein do not utilize a slotted tube. Instead, the tube is solid and the system is reconfigured to draw both the aqueous phase and organic phase through one end of the tube to form the droplets, obviating a need for a slot to pass the organic phase into the tube. This eases material choice and manufacturability.

Figure 1:
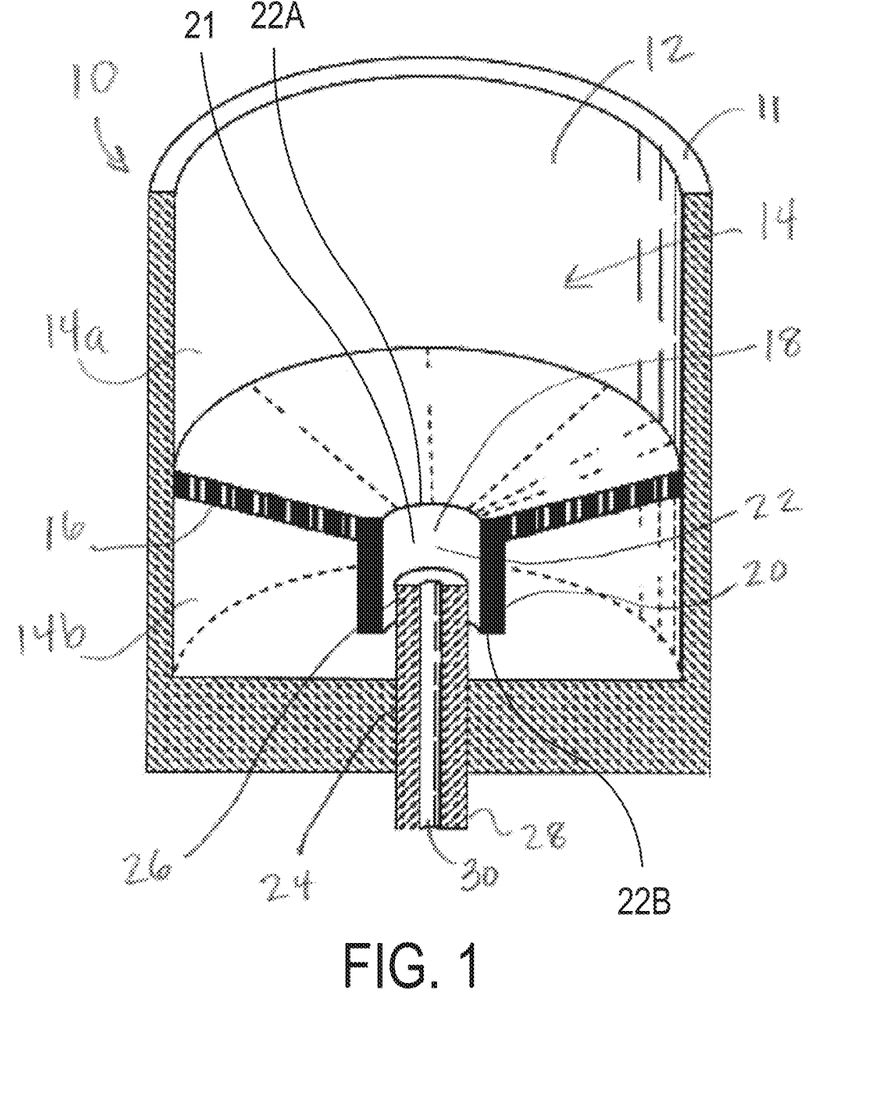
FIG. 1 illustrates a cross-sectional side view of an embodiment of a droplet generating system.

FIG. 1 illustrates a cross-sectional side view of an embodiment of a droplet generating system 10 comprising a body 11 having an open port 12 that allows fluid reagents to be loaded into a single reservoir 14. The small opening of the port 12 is functionally equivalent to the open top of a microplate or microcentrifuge tube. The port 12 also provides a path for gases to flow into the system 10, and may optionally be used as a structural fixture to attach the system 10 to a base station, as will be described in later sections. The function of the reservoir 14 is to hold fluid reagents. To load reagents into the reservoir 14, an organic fluid (e.g. oil) is deposited into the reservoir 14 through the open port 12. This step coats the interior of the reservoir 14 with the organic fluid. The reservoir 14 is split into a first reservoir portion 14a and a second reservoir portion 14b by a barrier 16. In this embodiment, the barrier 16 is semi-permeable so that the organic fluid is able to pass through the barrier 16. Since the first reservoir portion 14a is disposed above the second reservoir portion 14b, organic fluid from the first reservoir portion 14a is drawn by gravity (or other forces, e.g. centrifugal) through the semi-permeable barrier 16 into the second reservoir portion 14b. In addition, the barrier 16 has an opening 18 that allows the organic fluid to pass therethrough. In this embodiment, the opening 18 is circular and is concentric with the reservoir 14. In this embodiment, the opening 18 has a diameter of 400 micrometers and the reservoir 14 has a diameter of 8 mm. In addition, the barrier 16 includes a flange 20 that at least partially surrounds the opening 18, extending into the second reservoir portion 14b to form an indexer 22. For example, the flange 20 may present an inner surface in the shape of a cylinder. In some cases, the flange 20 may provide an inner cylindrical surface 21 that defines an outer cylindrical boundary of the indexer 22. It may be appreciated that the flange 20 may be comprised of a plurality of segments to function as a single flange. The flange 20 creates an enclosed area that acts as the indexer 22. The indexer 22 may have a height that extends between the upper portion or edge 22A of the flange and the lower portion or edge 22B of the flange. The system 10 further includes a tube 24 having a proximal end 26 and a distal end 28. The proximal end 26 is positioned within the indexer 22 (i.e. enclosed area) formed by the flange 20. The tube 24 has a microfluidic channel 30 through which fluid passes out the distal end 28. As shown here, the proximal end 26 of the tube 24 can be positioned between the upper edge or surface 22A of the indexer 22 and the lower edge or surface 22B of the indexer 22.

If enough organic fluid is deposited into the reservoir 14, the organic fluid is able to substantially fill the second reservoir portion 14b, rising up into the indexer 22 and then exiting through the microfluidic channel 30 of the tube 24.

In some embodiments, barrier 16 can include a semi-permeable membrane, material, or other barrier feature that or material that restrict or inhibits the flow of an aqueous phase or fluid therethrough, for example from first reservoir portion 14a (e.g. upper or top portion) to second reservoir portion 14b (e.g. lower or bottom portion) and to allow flow of an organic phase or fluid therethrough, for example from first reservoir portion 14a to second reservoir portion 14b. In some embodiments, barrier 16 is disposed between a top portion of the reservoir and a bottom portion of the reservoir. In some embodiments, barrier 16 is disposed between an upper portion of the reservoir and a lower portion of the reservoir. In some embodiments, an aqueous reagent, fluid, or phase can form spherically shaped partitions due to surface tension where it is in contact with the organic phase, and the partitions resist breakup and will not tend to dissociate during operation of the device. In some embodiments, the barrier 16 can operate based on principles of oil/water separation. In some embodiments, the barrier 16 can include a hydrophobic or other structure that facilitates such separation. In some embodiments, the barrier 16 can include one or more materials such as those described in Tu et al. "Fabrication of superhydrophobic and superoleophilic polystyrene surfaces by a facile one-step method" Macromol. Rapid Commun. 28:2262-2266 (2007); Lee et al. "The performance of superhydrophobic and superoleophilic carbon nanotube meshes in water-oil filtration" Carbon 49:669-676 (2011); Wu et al. "A hierarchical mesh film with superhydrophobic and superoleophilic properties for oil and water separation" J. Chem. Technol. Biotechnol. 87:427-430 (2011); Shang et al. "An in situ polymerization approach for the synthesis of superhydrophobic and superoleophilic nanofibrous membranes for oil-water separation" Nanoscale 4:7847-7854 (2012); Dong et al. "Superhydrophobic and superoleophilic hybrid foam of graphene and carbon nanotube for selective removal of oils or organic solvents from the surface of water" Chem. Commun. 48:10660-10662 (2012); Li et al. "ZnO nanorod array-coated mesh film for the separation of water and oil" Nanoscale Research Letters 8:183 (2013); and/or Zhang et al. "A self-cleaning underwater superoleophobic mesh for oil-water separation" Scientific Repots 3:2326, 1-5 (July 2013). The content of each of these journal articles is incorporated herein by reference.

In some embodiments, the barrier 16 can operate to prevent aqueous partitions from traversing the barrier, while at the same time allowing the organic phase to pass therethrough.

In some embodiments, the indexer 22 can include one or more features of an indexer as disclosed in U.S. patent application Ser. No. 16/865,062 filed May 1, 2020, PCT Patent Application No. PCT/US2018/058938 filed Nov. 2, 2018, or U.S. Provisional Patent Application No. 62/581,548 filed Nov. 3, 2017.

Figure 2:
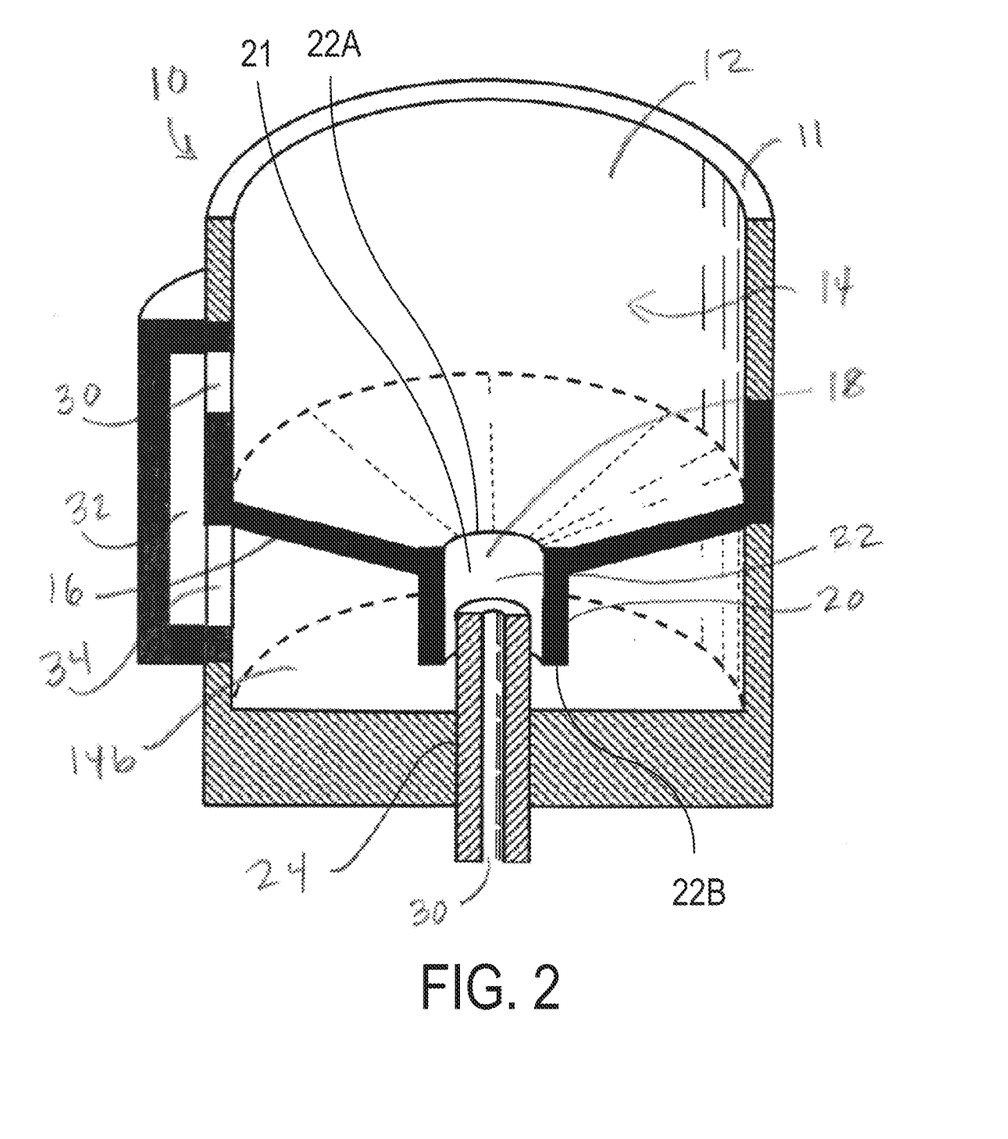
FIG. 2 illustrates a cross-sectional side view of another embodiment of a droplet generating system.

FIG. 2 illustrates an alternative design for the droplet generating system 10. Here the system 10 includes the similar components, however the barrier 16 is not permeable. In this instance, the organic fluid flows from the first reservoir portion 14a through a first side port 30 to a side chamber 32 and then flows from the side chamber 32 through a second side port 34 into the second reservoir portion 14b. Thus, the organic fluid is able to fill the second reservoir portion 14b, entering the indexer 22 and then exiting through the microfluidic channel 30 of the tube 24, as in FIG. 1.

Figure 3:
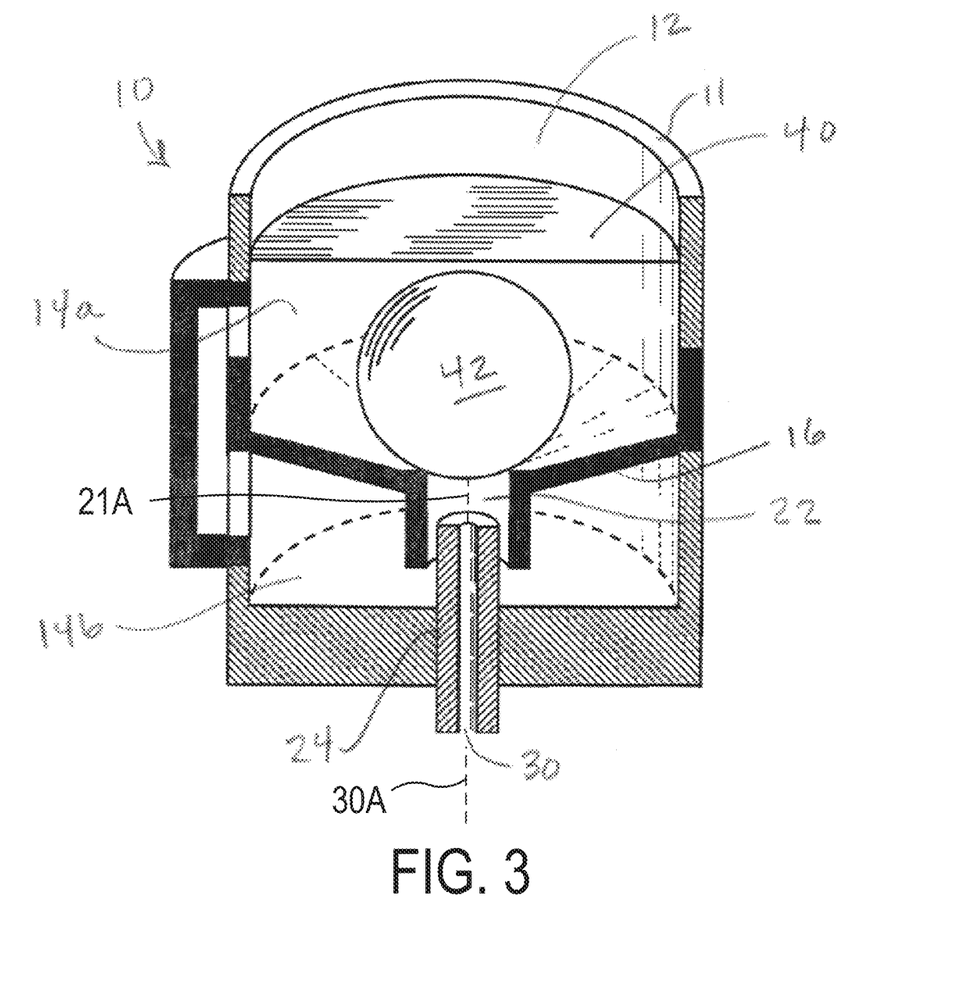
FIG. 3 illustrates the droplet generating system of FIG. 2 filled with organic fluid and a bolus of aqueous fluid.

FIG. 3 illustrates the droplet generating system 10 of FIG. 2 filled with organic fluid 40. In addition, aqueous fluid 42 is deposited into the first reservoir portion 14a through the same open port 12. The aqueous fluid 42 can be injected directly as a single bolus under the surface of the organic fluid 40 already occupying the first reservoir portion 14a, such as by using a pipette, or it can be added dropwise from above. In either case, the aqueous fluid 42 settles on the top surface of the barrier 16 because the aqueous fluid 42 is somewhat more dense than the organic fluid 40, and the upper surface of the barrier 16 is the lowest point available to the aqueous fluid 42 to sink. The aqueous fluid 42 is immiscible with the organic fluid 40 and thus the aqueous fluid 42 forms a generally spherical shape as it drops down to the lowest available surface of the first reservoir portion 14a. The upper surface of the barrier 16 is designed for the bolus of aqueous fluid 42 to settle upon and to come into contact with the indexer 22. The upper surface of the barrier 16 is generally conical in shape in order to direct the generally spherical bolus of aqueous fluid 42 to its center, which is the lowest accessible surface in the first reservoir portion 14a. But while the barrier 16 keeps the aqueous fluid 24 positioned on its upper surface, the organic fluid 40 is also in contact with the barrier surfaces. Indeed, in embodiments having a semi-permeable barrier 16, such a barrier 16 is comprised of a hydrophobic polymer that draws the organic fluid 40 into its many superficial facets and small channels. In this way, while the aqueous fluid 42 is held above the semipermeable barrier 16, organic fluid 40 is allowed to flow through or around the barrier 16 to access lower surfaces and open spaces below the barrier 16. Aqueous fluid 42 can thus be held midway in the reservoir 14; below the port 12, at the bottom of the first reservoir portion 14a, yet above the semipermeable barrier 16 and capillary tube 24. Organic fluid 40, meanwhile, has access to all internal surfaces of the reservoir, and in particular, both the first reservoir portion 14a and second reservoir portion 14 as divided by the semipermeable barrier 16.

The barrier 16 can take many forms, provided that the aqueous fluid bolus 42 remains above the barrier 16, and the organic fluid 40 is permitted to traverse the barrier 16. Typically, the barrier 16 is curved such that the surface facing the aqueous fluid 42 is convex. And, typically, the curvature of this surface is aligned with the central axis of the tube 22.

As shown in FIG. 3, the indexer 22 can be provided as a cylindrical surface positioned with its central axis 21A in alignment with a central axis 30A of the channel or lumen 30 of the tube 24.

Figure 4:
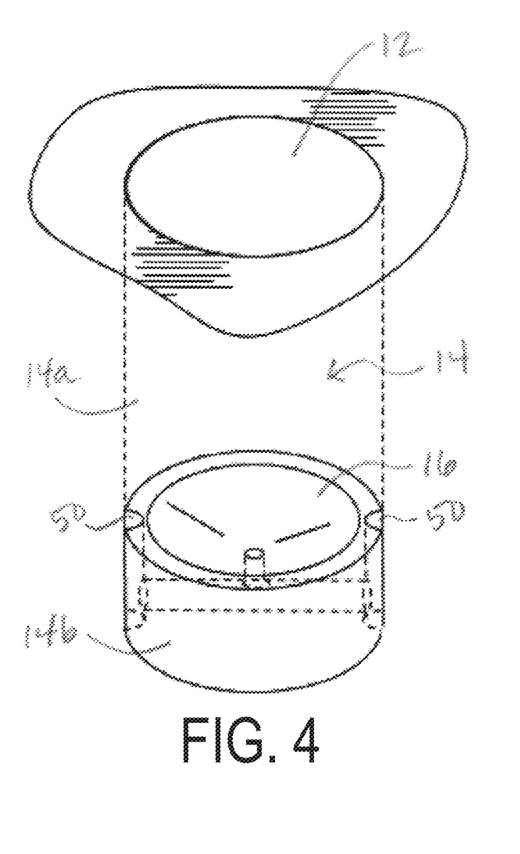
FIGS. 4-6 illustrate various embodiments of the barrier within the reservoir.
Figure 5:
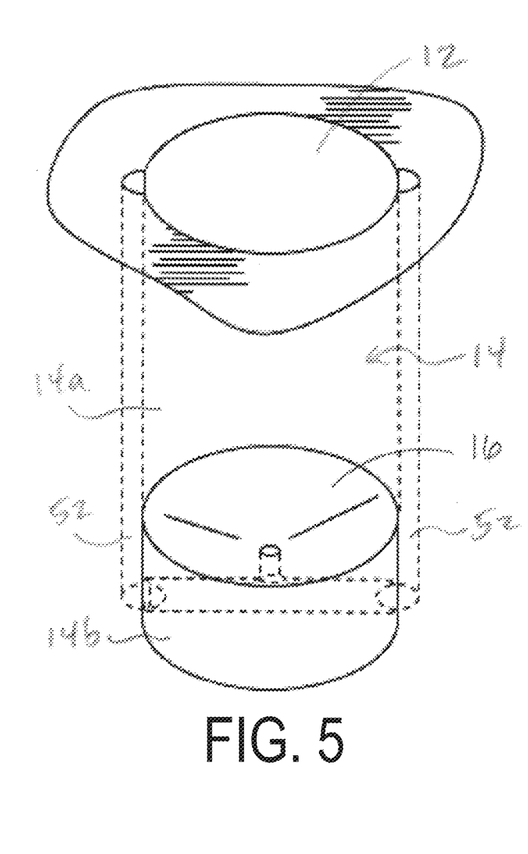
Figure 6:
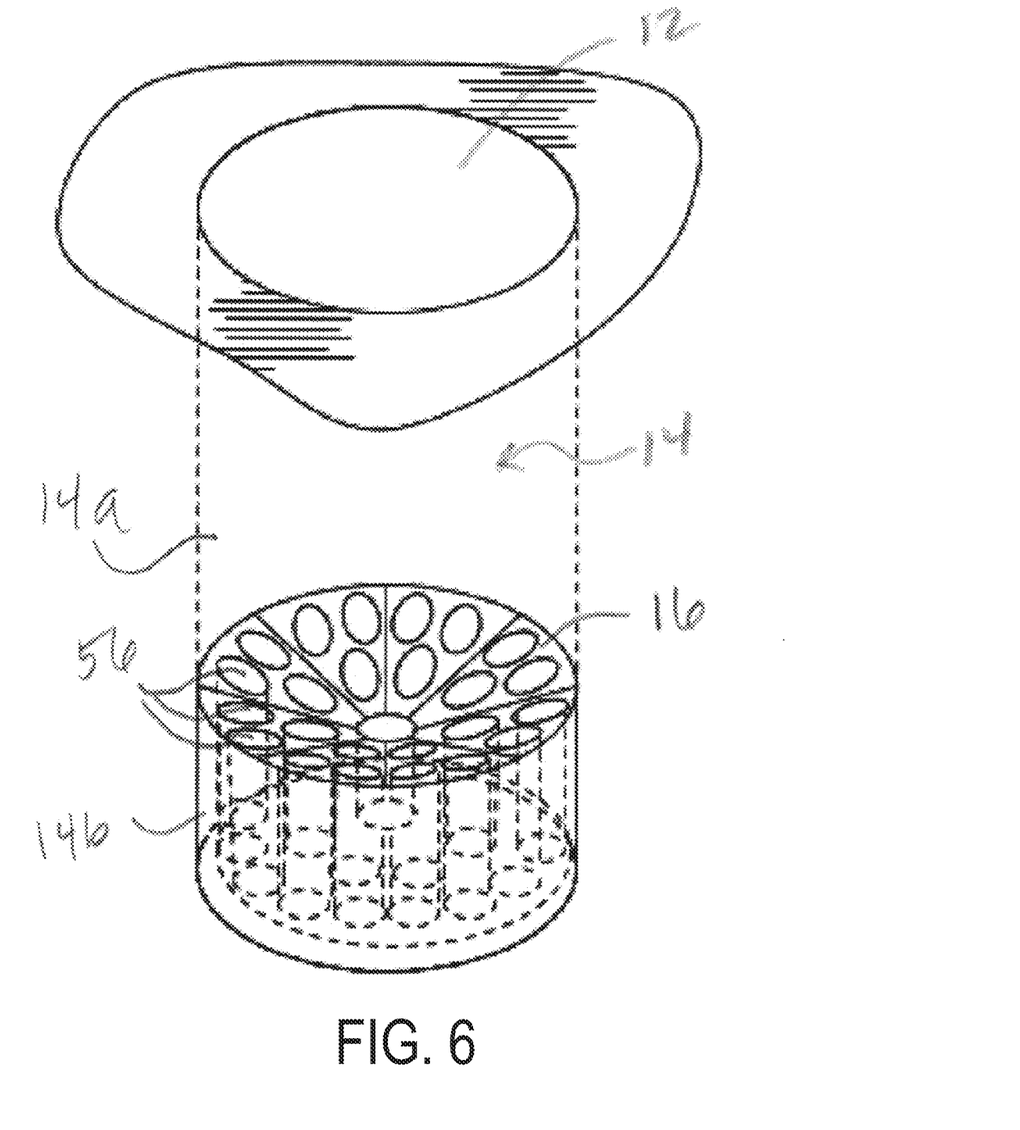

FIGS. 4-6 illustrate various embodiments of the barrier 16 within the reservoir 14. FIG. 4 illustrates a barrier 16 having side holes 50 for passage of the organic fluid 40 from the first reservoir portion 14a to the second reservoir portion 14b. FIG. 5 illustrates a similar barrier 16 without the side holes. Instead, the organic fluid 40 is able to pass from the first reservoir portion 14a to the second reservoir portion 14b via side channels 52 that extend along the reservoir 14. It may be appreciated that the barrier 16 can be comprised of a porous material, such as a porous filter, or comprised of a solid material, such as a polymer deposited by stereolithography (SLA). In the latter example, a hydrophobic polymer material may be formed as a rigid structure with small channels 56 between them, such as illustrated in FIG. 6. Such design combinations may be particularly advantageous for single sample and microwell plate formats and may be more or less suited to injection molding. Such channels 56, if suitably narrow, approximate the function of a filter material; the bolus of aqueous fluid 42 is simply too large to enter them, and therefore sits above them. According to exemplary embodiments, a hydrophobic surface wetted with organic fluid 40 will not readily yield a very narrow gap of, for example, 500 micrometers, to a bolus of aqueous fluid 42 resting above that gap. Instead, a bolus of aqueous fluid 42 will remain above that gap. Meanwhile, the organic fluid 40 occupying the opening 18 will be free to flow through the opening 18 into the indexer 22. In this way, organic fluid 40 can be transported around and under a bolus of aqueous fluid 42 resting on such a surface bearing a plurality of channels 56. In some embodiments, the barrier 16 is integrated with the body 11 and in other embodiments it is removable. In many embodiments, a hydrophobic surface is preferred.

Figure 7:
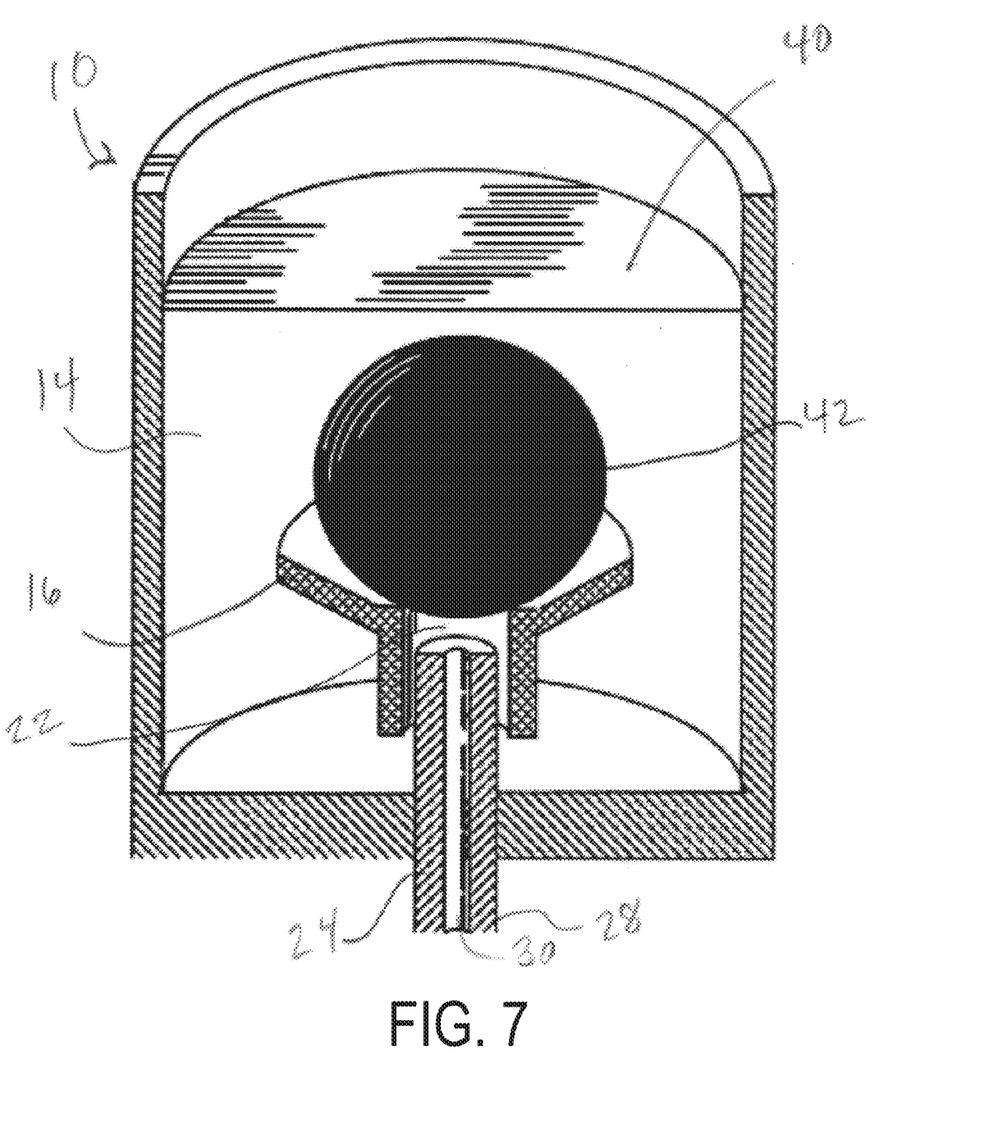
FIGS. 7-9 illustrate the production of droplets by the system.
Figure 8:
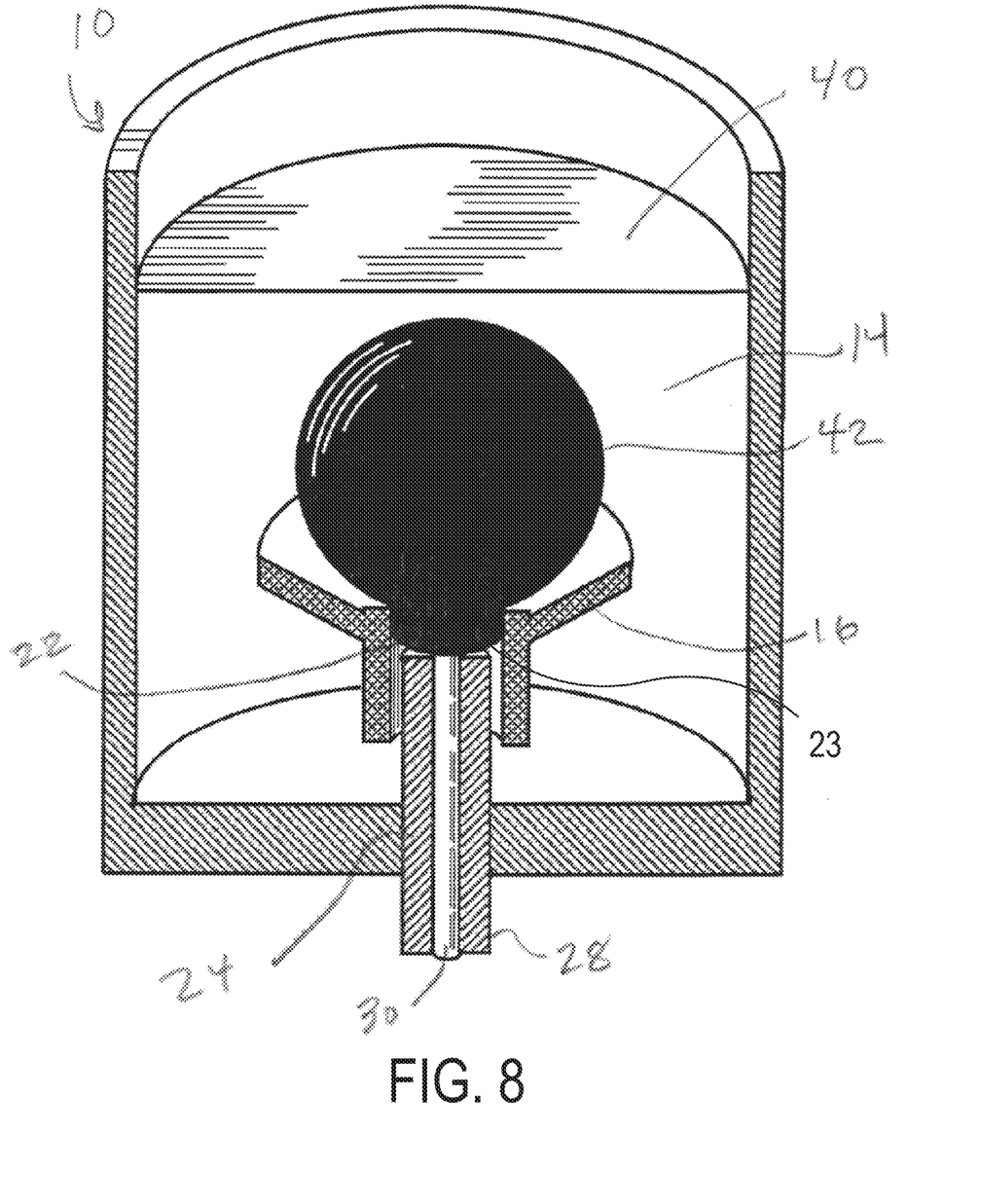
Figure 9:
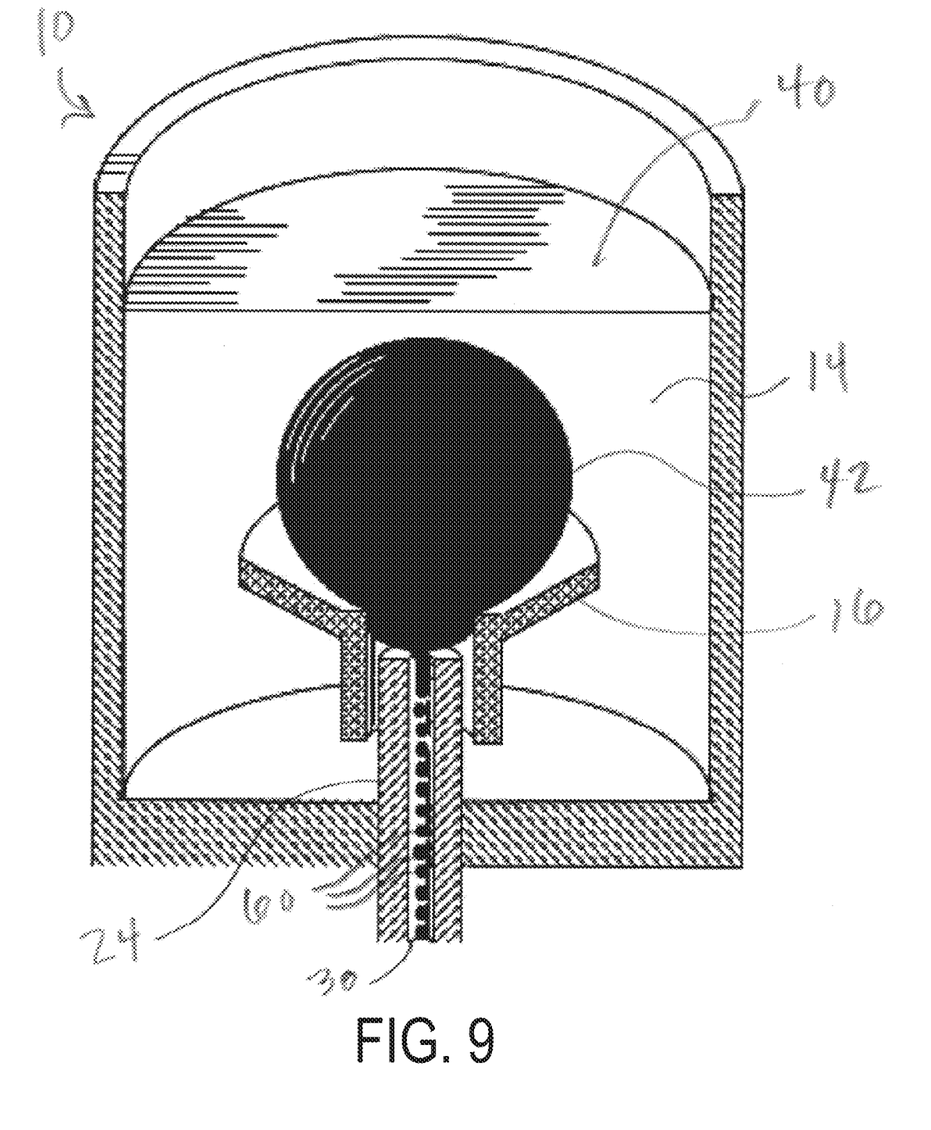

FIGS. 7-9 illustrate how droplets are formed by the system 10. In FIG. 7, a reservoir 14 is divided into a first reservoir portion 14a and a second reservoir portion 14b by virtue of a barrier 16 with a conical upper surface. The structure supporting the barrier is not shown. Both the first and second portions 14a, 14b are filled with organic fluid 40 (uncolored); a bolus of aqueous fluid 42 (black) rests on the upper surface of the barrier 16 and center of the indexer 22. FIG. 7 illustrates a non-energized configuration where the fluid reagents are loaded into the system 10 but before a pressure differential has been applied.

FIG. 8 illustrates the system 10 as in FIG. 7 but with a pressure differential applied such that the fluid reagents are compelled to flow out of the reservoir 14 through the tube 24. In some embodiments, the system 10 is coupled to a base station. The base station is used to hold the system 10 and to apply a differential pressure to the system 10. In an exemplary embodiment, the base station is comprised of an air compressor, air pressure regulator, a mechanism to seal to the port 12 of the system 10, and a pneumatic on/off switch. In another embodiment, a negative pressure is applied to the distal end 28 of the tube 24 using a manifold; such arrangement is particularly well suited for the system 10 when configured in a microwell plate format. Likewise, a base station with a vacuum pump may be used to create a low pressure between the system 10 and a catch container for a single sample device as well.

As illustrated in FIG. 8, the aqueous fluid 42 is drawn into the indexer 22 by the pressure differential. In some embodiments, the distance between the opening 18 of the barrier 16 and the proximal end 26 of the tube 24 is approximately 0.2-2 mm. This area allows the aqueous fluid 42 (and surrounding organic fluid 40) to transition and be drawn into the microfluidic channel 30 as a fluid-fluid interface toward the top of the tube 24. As depicted in FIG. 8, the indexer 22 can be a generally cylindrical void positioned with its central axis aligned with the central axis of the tube 24. The cylindrical surface of the indexer can be coated with or include a hydrophobic material. The indexer 22 can operate to create a uniform fluid-fluid interface 23 that is perpendicular to the central axis of one open end of the tube 24 between the (upper) aqueous fluid 42 from within the reservoir 14.

Referring to FIG. 9, as the pressure differential causes the fluids 40, 42 to be drawn from the reservoir 14, the diameter of the generally spherical aqueous bolus 42 shrinks and the upper surface of the organic fluid 40 level falls as it, too, flows out of the tube 24. The ratio of organic fluid 40/aqueous fluid 42 is balanced such that the aqueous fluid 42 is exhausted before the organic fluid 40 runs out. In this way, from the moment an appropriate pressure differential is applied, organic fluid 40 will flow first, followed by droplet production until the aqueous fluid 42 is exhausted, followed again by organic fluid 40. Thus, as shown in FIG. 9, droplets 60 of aqueous fluid 42 are formed in the microfluidic channel 30 of the tube 24.

Figure 10A:
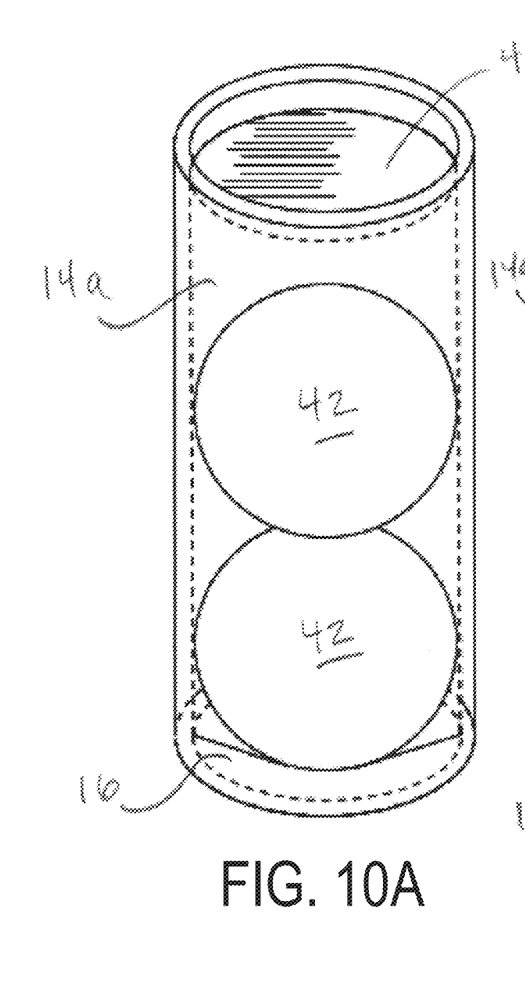
FIGS. 10A-10C illustrate the processing of multiple boluses of aqueous fluid from within a single reservoir.
Figure 10B:
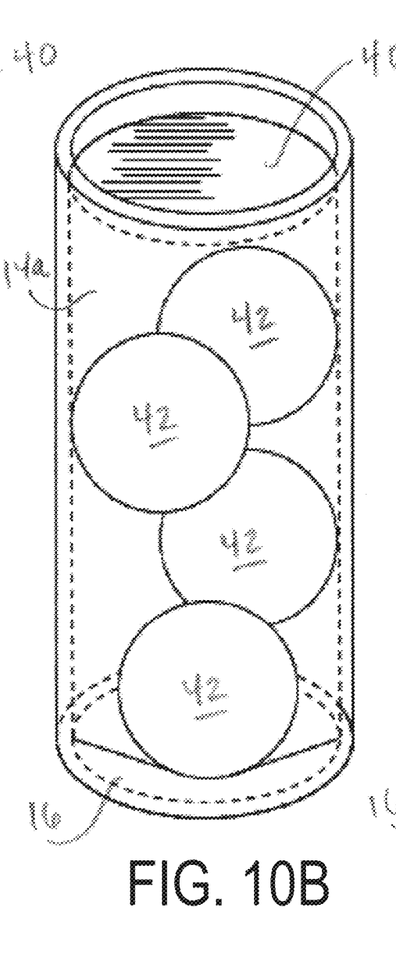
Figure 10C:
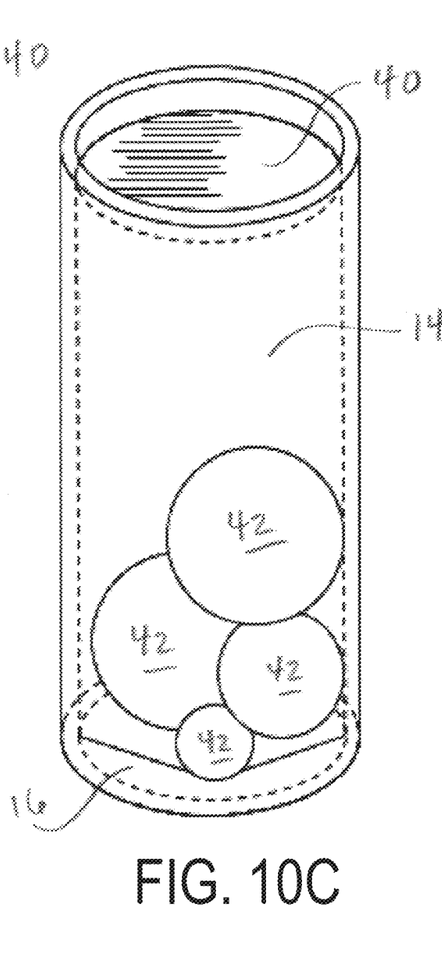

In some embodiments, it is advantageous to process multiple boluses of aqueous fluid 42 from within a single reservoir 14, as illustrated in FIGS. 10A-10C. FIG. 10A illustrates multiple boluses of aqueous fluid 42 stacked within a first reservoir portion 14a so that the boluses are processed sequentially. Alternatively, as illustrated in FIG. 10B, multiple boluses of aqueous fluids 42 may be stacked in a non-linear configuration. Further, as illustrated in FIG. 10C, multiple types/sizes of boluses of aqueous fluid 42 which do not process sequentially, may be collocated in the first reservoir portion 14a.

3D printing is an ideal means for manufacturing the geometries described by the embodiments, and is a process uniquely suited to producing blind holes, small features, enclosed channels, and other physical aspects of the system 10 and barrier 16, in particular. Moreover, additive manufacturing techniques are capable of manufacturing the system 10 in a multitude of form factors, such as single shot device or in a standard microwell plate format.

While it is technically possible to realize the systems 10 using additive manufacturing alone, the very narrow microfluidic channel 30 in the capillary tube 24 segment is difficult to replicate using existent technologies. A capillary tube segment comprised of glass, metal, or polymer is thus disclosed as the preferred method for forming the tube 24. It is further contemplated that the capillary tube 24 is best installed into the body 11 as shown in the figures and affixed with adhesive. However, it may be appreciated that in other embodiments the tube 24 is formed with the body 11 as a single unit.

Before operating the system 10, two immiscible fluids 40, 42 are loaded into the reservoir 14 as previously described. Fluid flow begins when a pressure differential is applied such that the reservoir 14 experiences a higher pressure than the distal end 28 of the tube 24. In a preferred embodiment of a single shot device, the pressure differential is achieved by connecting the port 12 to a pressurized gas source, e.g., a base station. In some embodiments, in a standard microplate bearing a multitude of droplet generating systems 10 is placed onto a standard vacuum manifold so as to create a lower pressure at the distal end 28 of the tubes 24 at the bottom of the plate. A variety of mechanism are available to create a pressure differential as desired to operate the system 10. In exemplary embodiments, the pressure differential can be controlled by a pressure regulator and be switched rapidly between the off/on.

Droplets are formed when the fluid-fluid interface positioned at the top of the tube 24 (and within the confines of the indexer) is withdrawn into the tube as a laminar coaxial fluid flow. Since the sheath fluid is organic fluid 40 and the core fluid is aqueous, the core flow breaks up at some distance from the top of the tube, but before it exits the tube. Droplets are thus formed while within the confines of a laminar flow channel and are as regular as the flow itself; in general, the more regular the flow, the more uniform the droplets, where droplet uniformity is characterized by diameter and volume variation.

It may be appreciated that typically the organic fluid 40 is less dense than the aqueous fluid 42. Therefore, the first reservoir portion 14a is above the second reservoir portion 14b in a stacked or vertical orientation.

The indexer 22 is a generally cylindrical void positioned with its central axis aligned with the central axis of the tube 24. It is generally hydrophobic. The function of the indexer 22 is to create a uniform fluid-fluid interface that is perpendicular to the central axis of one open end of the tube 24 between the (upper) aqueous fluid 42 from within the reservoir 14.

Motive force for the fluids can be achieved by applying a pressure differential. This can be achieved using centrifugal force, or lower-than-ambient pressure applied to the outlet or a higher-than-ambient pressure applied to the outlet.

Organic fluid is used to describe the fluid that is immiscible with the aqueous phase. This language was chosen to facilitate description of the invention using common language. However, other terms can be used to describe the same thing. For example, "carrier fluid" or "continuous fluid" are two synonymous terms.

Figure 11:
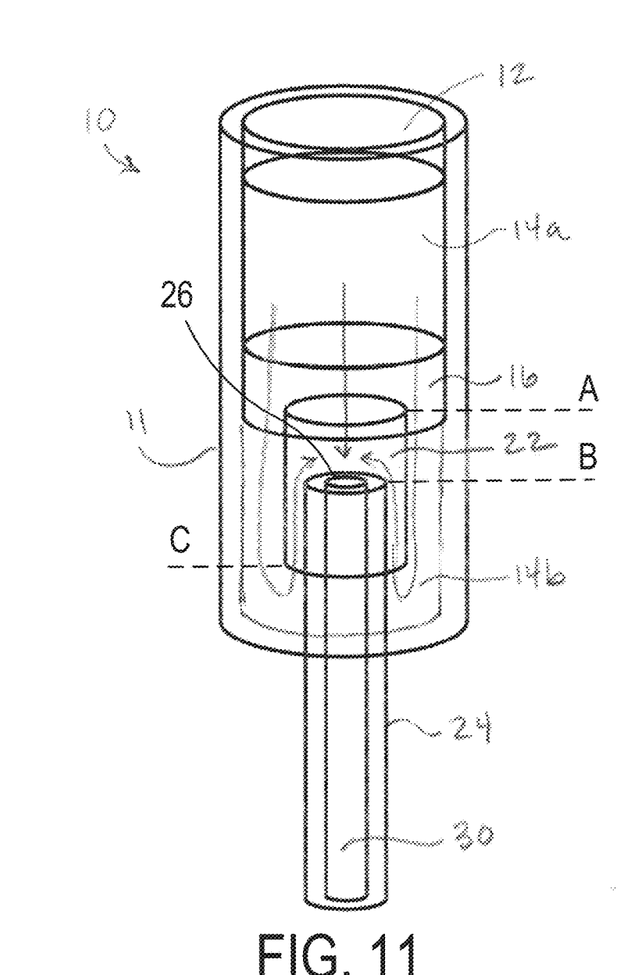
FIG. 11 illustrates an external view of an embodiment of the droplet generating system.
Figure 12:
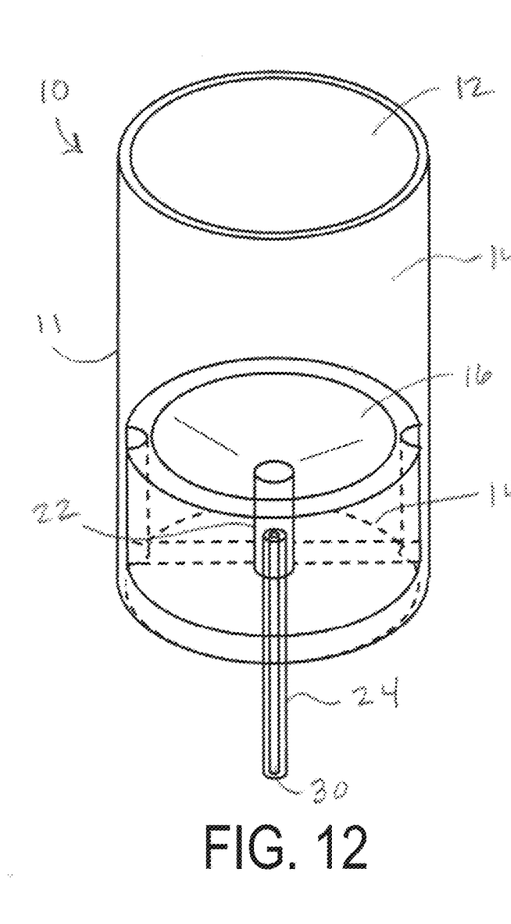
FIG. 12 provides an alternative view of a system such as that in FIG. 11.

Referring to FIG. 11, an embodiment of the droplet generating system 10 is illustrated. Here, the system 10 comprises a single sample device comprised of a single unit body 11 forming a port 12, a first reservoir portion 14a, barrier 16, a second reservoir portion 14b, an indexer 22, and a tube 24 having a microfluidic channel 30. In some embodiments, capillary tube 24 is installed into the unit body 11 and a spot of adhesive holds the capillary tube 24 in place. FIG. 11 also illustrates the flow pattern (arrows) of organic fluid from the first reservoir portion 14a to the second reservoir portion 14b, and up into the indexer 22 (from beneath) where the organic fluid then flows into the proximal end 26 of the tube 24 and out the microfluidic channel 30. It may be appreciated that some organic fluid also travels into the indexer 22 from above along with the aqueous fluid. This allows coaxial flow through the channel 30 forming droplets of aqueous fluid. FIG. 12 provides an alternative view of such a system 10. Here, the system 10 comprises single sample device comprised of a single unit body 11 forming a port 12, reservoir 14, barrier 16, indexer 22, and tube 24 having a microfluidic channel 30. The fluid-fluid interface, when the device is not running can be anywhere. In exemplary embodiments, it's at a point above the top of the tube 24 (e.g. above plane B). The fluid-fluid interface can self-adjust when the device is running (making droplets). In the not-running state, like right after a person fills the common port with 2 fluids (oil and water) it can be between planes A and B. When the device is running (making droplets) the fluid-fluid interface can be right above the tube 24 (e.g. just above plane B). If so, a portion of the fluid-fluid interface gets pulled into the tube (24), and that sets up coaxial flow. According to some embodiments, when the device is in the operational running state, the fluid-fluid interface can be right above the tube 24 (e.g. above plane B) and can be bending into (or flowing into) the top or proximal end of the tube 24. For example, the interface may be in a semi-circle or "U" shape (in cross-section) where the top of the semi-circle or "U" shape is at or near plane A and the bottom of the semi-circle or "U" shape is at or near plane B. The tangent of the bottom of the semi-circle or "U" shape can be perpendicular to a longitudinal axis of the tube 24 or the channel 30 thereof. Coaxial flow may then occur between the top of the tube (e.g. plane B) and the bottom of the indexer 22 (e.g. plane C) or some other downstream location. In some instances, the length of the coaxial flow may be entirely between planes B and C (e.g. at moderate flow rates). In some cases, coaxial flow may extend from plane B to well below plane C. According to some embodiments, nice uniform droplets are formed as the coaxial flow (which can be a non-turbulent laminar flow in this tiny tube) breaks into little spheres which may be preferred by nature because they have a lower surface area to volume. Hence, according to some embodiments, the device can create a nice laminar coaxial flow from which droplet generation results.

In some embodiments, the fluid-fluid interface is going to be round. That's because the water (from the top) is surrounded by oil, and the tube 24 is hydrophobic. Water doesn't like that. So the water forms a ball if it has to get into that area, and so it does. The water does not want to touch the hydrophobic material. A rounded shape is the minimum surface area so it does that. So the interface may not be planar. The interface may sit at or near the top of the tube (e.g. at or near plane B). The water is heavier than the oil and might like to flow into those places down there, but at some point, if the holes it can flow into are too small, like the opening of the tube 24, the water won't go in there without force or pressure. It may be helpful to consider a plastic sheet with a pin hole in it. A drop of water (which may be similar to the volume described here) won't go through that tiny hole. It will sit on top of it. However upon the application of pressure, the water will flow through.

Any portion of the system 10 may be used as an attach point to a base station, but it is convenient to seal the port 12 directly to the base station pressure supply outlet. Such arrangement facilitates the application of a positive pressure directly to the contents of the reservoir 14. For example, the port 12 can be made to seal to a pressurized air nozzle such that the system 10 is held in place while being pressurized. Such a connection to a base station allows for entry of an adjustable gas pressure to the interior of the reservoir 14 as a means of pressurizing the fluids therein. Likewise, the lower end of the system 10 can be shaped to retain a tube or catch container 122. Such arrangement facilitates capturing the emulsion generated. Alternatively, a negative pressure can be used to flow fluids through the system 10, and this negative pressure can be applied through the catch container 22 retained at the bottom of the system 10, or equivalent.

Figure 13:
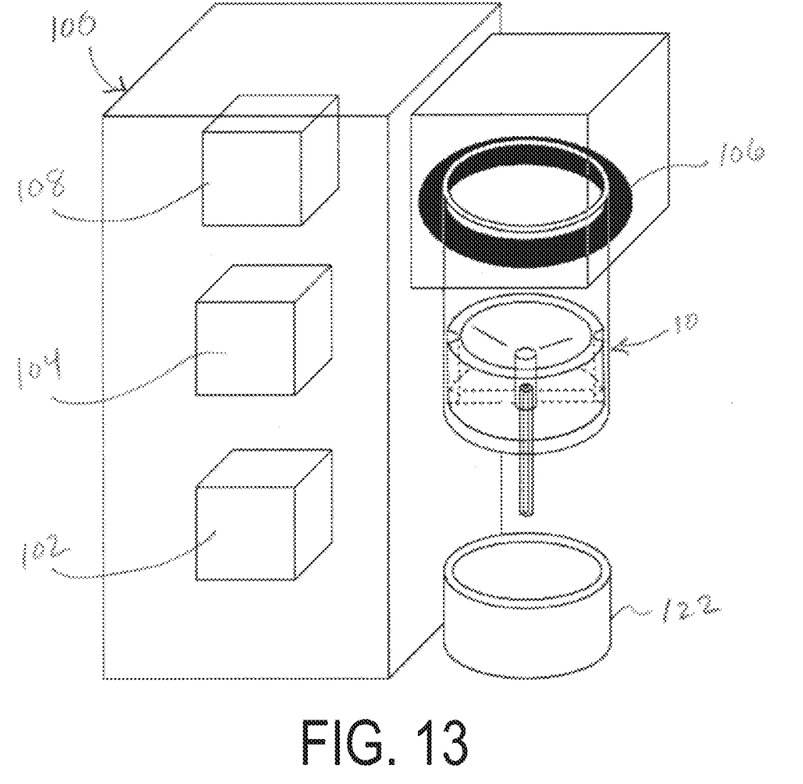
FIG. 13 illustrates the droplet generating system coupled to a base station.
Figure 14:
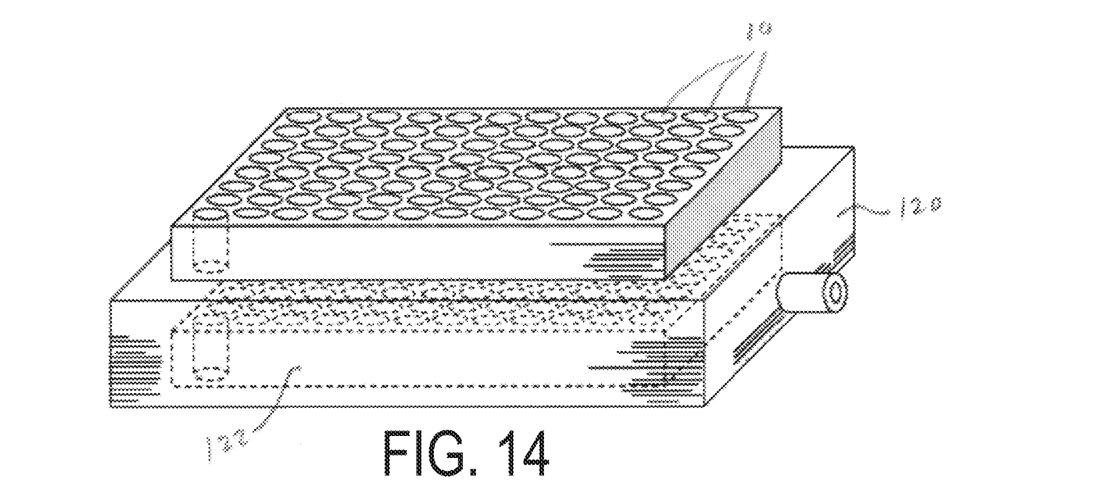
FIG. 14 illustrates a plurality of droplet generating systems comprising is a multi-sample device in a standard 96 well microplate format.

Referring to FIG. 13, the system 10 is illustrated coupled to a base station 100. The base station is used to hold the system 10 and to apply a differential pressure to the system 10. In an exemplary preferred embodiment, the base station 100 is comprised of an air compressor 102, air pressure regulator 104, a mechanism 106 to seal to the upper portion of the system 10 and a pneumatic on/off switch 108. In another embodiment, illustrated in FIG. 14, a negative pressure is applied to the tube 24 at the lower end of the system 10 using a manifold 120; such arrangement is particularly well suited for the system 10 when configured in the microwell plate format. Likewise, a base station with a vacuum pump may be used to create a low pressure between the system 10 and a catch container 122 for a single sample device as well. Another embodiment of the system 10 comprises a multi-sample device in a standard 96 well microplate format as in FIG. 14, wherein each position of an 8×12 array is comprised of an equivalent single sample system 10.

In some embodiments, the system can be configured so that the fluids flow under centrifugal force through the capillary tube.

Embodiments of the present invention provide a method and apparatus for the controlled production of small droplets having a narrow size distribution. Embodiments of the present disclosure also provide a method of manufacturing an improved apparatus cost-effectively using readily available and inexpensive materials.

According to embodiments of the present invention, an emulsion is formed using the presently disclosed apparatus by combining two fluids in an indexer, and the indexer can be positioned between two fluid chambers or reservoir portions.

In some cases, two reservoir portions, an indexer, and a tube can be colocated with, and together comprise, a housing body. The first reservoir portion can be in fluid communication with a fluid inlet port of a tube, and the second reservoir portion can be in fluid connection with the first reservoir portion and also with the fluid inlet port of the tube.

Aqueous reagents can settle into the first reservoir portion and stay settled there even as oil is introduced to overlay the water in the first chamber and permeate into the second reservoir portion. The two fluids can stay in place largely because of surface characteristics, small geometrical features, differences in density, and immiscibility. In some cases, the system may be placed in a centrifuge to provide centrifugal force. In some cases, an aqueous phase and an organic phase enter the proximal end of a tube under the force of gravity. The two fluids or phases can squeeze together to form a coaxial flow within the tube. The coaxial flow can either break into droplets near the proximal end of the tube or continue as a coaxial stream that breaks into droplets later, closer to the distal end of the tube. The inner flow can include the aqueous phase and the outer concentric flow can include the organic phase.

In some cases, a method of the invention comprises (a) forming droplets of a first liquid in a coaxial laminar flow of a second liquid, each droplet having a volume of between 1 fL and 1 nL, and wherein the first and second liquids are, at most, sparingly soluble (more preferably, substantially immiscible) in one another. Laminar flow is defined as a non-turbulent fluid flow.

Exemplary systems and methods disclosed herein are particularly well-suited for making a substantially monodisperse collection of droplets having a mean volume of from 1 fL to 1 pL; for example, a monodisperse collection of droplets has a normal distribution of droplet diameters, with a mean diameter D of from 1 micrometer to 100 micrometers, and a coefficient of variation of 3%.

In one embodiment of the invention, substantially uniformly sized droplets are generated using capillary microfluidic pathways, gap junctions, piezo actuators, software, and electronics. By controlling the electric impulses to the actuator(s) via a computer control system, very precisely sized droplets can be produced in a laminar flow of a substantially immiscible, or at least no more than sparingly soluble, liquid. For example, droplets for PCR are formed by coextruding two fluids coaxially in a microfluidic pathway with the inner fluid containing an aqueous solvent containing PCR reagents dissolved, dispersed or suspended therein. Advantageously, the droplets' narrow size distribution makes each droplet functionally interchangeable, and the number or concentration of reagents within the droplets can be described by a Poisson distribution.

In another embodiment of the invention, the emulsion production system is a stand-alone bench top unit. The benchtop unit consists of a means to supply one or all of the following: a pressure source, pressure control, a fluid source, fluid flow control, a fluid filtration capability, a mating fixture for the inlet port, a mating fixture for the outlet port, physical support for the disposable component, a lathing mechanism to retain the disposable component, a computer based user interface, a touch screen, a computer based device control system, an ultrasonic pulse generator, and a waste container.

By oscillating the pressure of the oil, higher pressures are experienced periodically. These higher pressures force the flow of water in the center of the tube to reduce in diameter, pinching the flow of water. Those narrowed areas ultimately become neck that divide the flow of water into droplets. Synching the waves to a piezo element allows the user to time the droplets and to visualize their formation.

One embodiment of the invention is an emulsifier unit. The device is used to combine two or more fluids into an emulsion. The disposable element of the device is comprised of a first fluid inlet port in fluid communication with a pressure chamber. The non-disposable elements of the device comprise one or more temperature zones in order to maintain uniform viscosity and fluid flow. A product outlet port allows an emulsion stream to exit the unit.

In some cases the droplets have a coefficient of variation of less than 10%. In some cases the droplets have a coefficient of variation of less than 7%. In some cases the droplets have a coefficient of variation of less than 5%. In some cases the system is capable of producing droplets with a mean diameter between 300-700 femtoliters.

In some embodiments, where heat-sensitive compounds are present, it is contemplated that the apparatus will be operated above or below room temperature (~25° C.), in the range of 30 to 200° F. (−1 to 92° C.), with 30 to 80° F. (1 to 100° C.) being most desirable for most PCR droplet chemistry. In other embodiments, where more thermally stable materials are employed, e.g., where the droplets being formed are solid organic polymer beads, or where the apparatus may be operated at even higher temperatures, e.g., 300° F. (147° C.). Accordingly, it is contemplated that the apparatus will be operated at a temperature of from 20 to 300° F. (−7 to 147° C., or, alternatively, 20 to 200° F. (−7 to 92° C.), or alternatively, 20 to 100° F. (−7 to 37° C.).

It is also contemplated that in some embodiments the pressures of the first and second liquids in the apparatus is carefully controlled. In one embodiment, each of the liquids has, independently, a pressure of 2000 psi or less, e.g., from 10-100 psi; more typically 20-100 psi (excluding the pervaporation unit, which, in one embodiment, is expected to operate at a higher pressure). In another embodiment, either or both liquids have a pressure that exceeds 100 psi. The two liquids can be supplied by a pressure supply system.

An exemplary method of making substantially uniformly sized droplets can include forming droplets of a first liquid in a laminar flow of a second liquid, each droplet having a mean droplet volume of between 1 nL and 1 fL, and forming droplets by moving the first liquid from a first fluid chamber through a microfluidic channel.

All features of the described systems and devices are applicable to the described methods mutandis mutandis, and vice versa.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A droplet generating system comprising:
   a reservoir configured to receive an organic fluid and an aqueous fluid;
   a barrier separating the reservoir into a first reservoir portion and a second reservoir portion, wherein the barrier is capable of preventing the aqueous fluid from entering the second reservoir portion;
   a tube disposed beneath the barrier, the tube having a proximal end and a microfluidic channel; and
   an indexer defined by a cylinder having a top entrance and a bottom entrance,
   wherein the proximal end of the tube is disposed within the indexer cylinder, and between the indexer top entrance and the indexer bottom entrance,
   wherein the second reservoir portion of the reservoir extends below the bottom entrance of the indexer,
   wherein the indexer is configured to allow organic fluid flow from the second reservoir portion beneath the indexer, through the indexer bottom entrance, and into the microfluidic channel at the proximal end of the tube, and
   wherein the indexer guides the aqueous fluid and the organic fluid into the microfluidic channel so as to form droplets of the aqueous fluid.

2. A droplet generating system as in claim 1, wherein the first reservoir portion is above the second reservoir portion in a vertically stacked orientation.

3. A droplet generating system as in claim 1, wherein the indexer is in fluid communication with an upper and lower surface of the barrier.

4. A droplet generating system as in claim 1, wherein the indexer creates an organic fluid-aqueous fluid interface positioned generally perpendicular to a longitudinal axis of the tube.

5. A droplet generating system as in claim 4, wherein the organic fluid and aqueous fluid are drawn through the microfluidic channel with a pressure differential.

6. A droplet generating device comprising:
   an indexer defined by a cylinder having a top circular entrance and a bottom circular entrance and configured to receive a first fluid enter from above the top circular entrance and downward through the top circular entrance and into the cylinder and a second fluid from below the bottom circular entrance and upward through the bottom circular entrance into the cylinder, wherein the first fluid and the second fluid are immiscible; and
   a tube having a proximal end and a microfluidic channel configured to receive the first fluid and second fluid,
   wherein the proximal end of the tube is disposed within the indexer cylinder, and between the indexer circular top entrance and the indexer circular bottom entrance.

7. A droplet generating device as in claim 6, wherein the first fluid comprises oil and the second fluid comprises water.

8. A droplet generating device as in claim 6, further comprising a reservoir configured to receive the first fluid and second fluid prior to entering the indexer.

9. A droplet generating device as in claim 6, wherein the tube is insertable into the device.

10. A droplet generating device as in claim 6, wherein the device is made using additive manufacturing.

11. A droplet generating device as in claim 10, wherein the additive manufacturing comprises stereolithography.

12. A droplet generating device as in claim 6, further comprising a body housing the indexer and at least a portion of the tube.

13. A droplet generating device as in claim 12, wherein the body is comprised of a polymer.

14. A droplet generating device as in claim 13, wherein the polymer is hydrophobic.

15. A droplet generating device as in claim 12, wherein the body is configured to fit a base station.

16. A droplet generating device as in claim 15, wherein the base station comprises a gas pressure source, a pressure regulator, and a pneumatic on/off switch.

17. A droplet generating device as in claim 15, wherein the body gas tight connects to the base station with a locking mechanism.

18. A droplet generating device as in claim 17, wherein the locking mechanism comprises a quick disconnect, a pressure fit or threads.

19. A droplet generating device as in claim 17, wherein the locking mechanism is on an exterior of the device.

* * * * *